H. C. MAYERHOFF.
INSECT COLLECTING ATTACHMENT FOR CULTIVATORS.
APPLICATION FILED DEC. 15, 1914.

1,156,303.

Patented Oct. 12, 1915.
2 SHEETS—SHEET 1.

H. C. Mayerhoff,
Inventor

Witnesses
by C. A. Snow & Co.
Attorneys

H. C. MAYERHOFF.
INSECT COLLECTING ATTACHMENT FOR CULTIVATORS.
APPLICATION FILED DEC. 15, 1914.
1,156,303.
Patented Oct. 12, 1915.
2 SHEETS—SHEET 2.
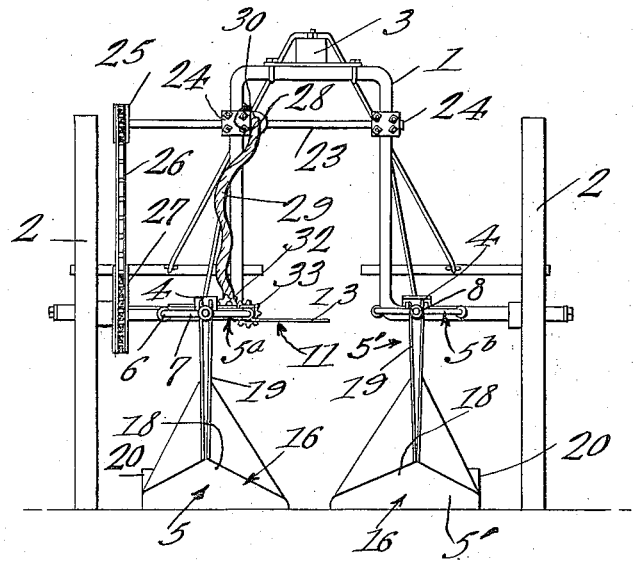
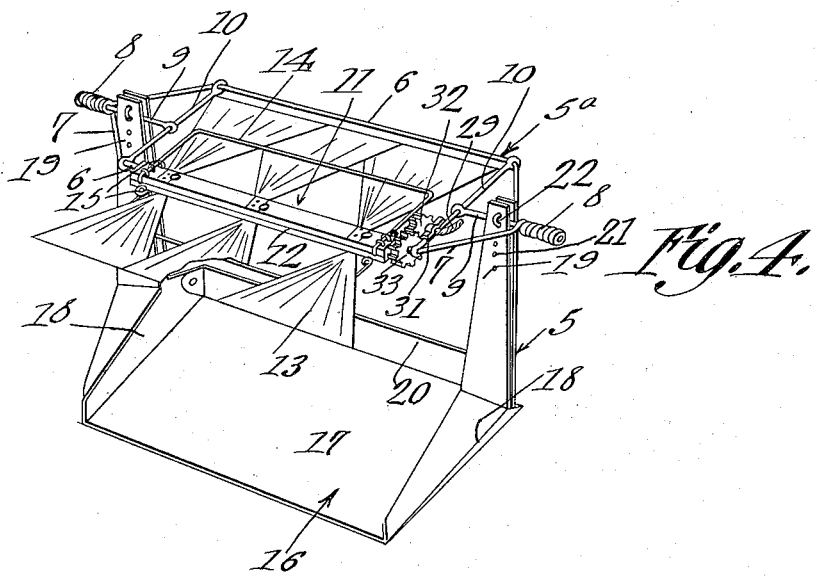

UNITED STATES PATENT OFFICE.

HUGH C. MAYERHOFF, OF BASIC, MISSISSIPPI.

INSECT-COLLECTING ATTACHMENT FOR CULTIVATORS.

1,156,303.  Specification of Letters Patent.  Patented Oct. 12, 1915.

Application filed December 15, 1914. Serial No. 877,389.

*To all whom it may concern:*

Be it known that I, HUGH C. MAYERHOFF, a citizen of the United States, residing at Basic, in the county of Clarke and State of Mississippi, have invented a new and useful Insect-Collecting Attachment for Cultivators, of which the following is a specification.

The present invention appertains to insect collecting apparatus, and aims primarily to provide a novel attachment for various cultivators, and which is adapted for collecting boll weevil from cotton plants, or for gathering other insects also, this invention being an improvement over the machine for catching boll weevil disclosed in my copending application, Serial No. 791,537, filed September 24, 1913.

This invention contemplates the provision of a cultivator attachment which will be readily and effectively applicable to various sulky or riding cultivators for collecting the boll weevil or other insects from the opposite sides of a row of cotton plants, and other vegetation.

It is also within the scope of the invention, to improve the apparatus or attachment generally in its construction, to thereby enhance the utility thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawings, wherein:—

Figure 1:
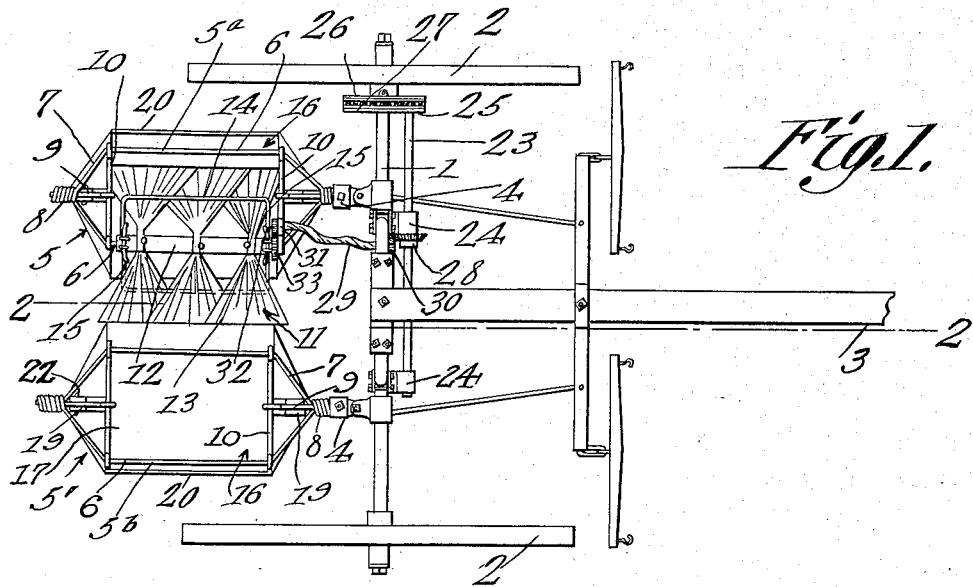
Figure 2:
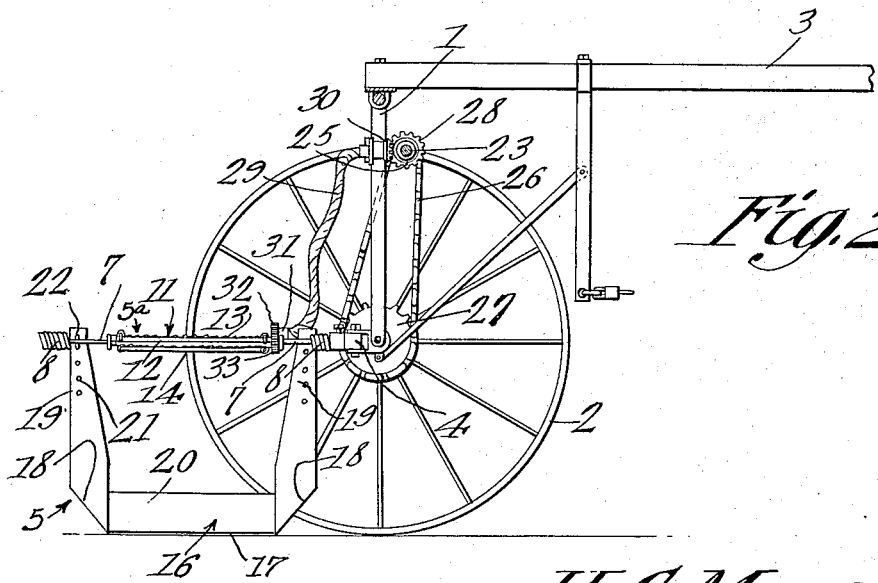

Figure 1 is a plan view of a cultivator having the present attachment applied thereto. Fig. 2 is a longitudinal section on the line 2—2 of Fig. 1. Fig. 3 is a rear view of the contrivance. Fig. 4 is an enlarged perspective view of the main section of the present appliance.

In the drawings, there is delineated an ordinary cultivator embodying the arched axle 1, having the ground wheels 2 journaled upon its ends or spindles, and having the tongue 3 secured upon its upper or crest portion.

It is to be understood at the outset, that the present device may be applied to various cultivators with equal success and propriety. The coupling sockets 4 which are connected by universal joints to the lower portions of the arched axle 1, are utilized for the attachment of the present appliance, when the beams or gang bars are removed.

The present appliance or attachment embodies two sections 5 and 5' which are adapted to replace the pair of beams or gang bars (not shown) of the cultivator. The section 5 is the main one, while the section 5' is an auxiliary or complementing one. The section 5 embodies a skeleton or frame-like beam 5ª, the forward end of which is engageable in one of the coupling sockets 4 of the cultivator frame, while the section 5' embodies a beam similar to the beam 5ª and having its forward end engageable within the other coupling socket 4, so that the two sections 5 and 5' of the appliance may trail in rear of the axle 1 at the opposite sides of the row of cotton plants or other vegetation and may swing both vertically and horizontally to properly coöperate with the plants and the soil.

The beam 5ª of the main section 5 embodies a pair of longitudinal parallel rods 6 having the converging portions 7 at their opposite ends, and which terminate in the coiled portions 8. The coiled portions 8 at the opposite ends of the beam 5ª embrace longitudinal rods 9 which project between the converging portions 7, and the inner ends of which are bent around cross rods 10, the terminals of which are bent into eyes embracing the body or parallel portions of the rods 6, adjacent the converging portions 7. Thus, the beam 5ª is provided with a central opening between the body portions of the rods 6 and the cross rods 10, the said opening being designed for enabling the beater or agitator to operate therethrough as will hereinafter appear.

The rotary beater or agitator 11 embodies a pair of longitudinal bars 12 bolted or otherwise clamped together over the body portion of one of the rods 6 to rotate freely thereon, and dried and trimmed palmetto leaves 13 having their stems secured in any suitable manner to the outer or remote sides of the bars 12. The palmetto leaves 13 are ideal for the purpose, since they are sufficiently stiff to shake the plants by their engagement therewith, but they are also sufficiently flexible or yieldable to prevent injury to the plants. The palmetto leaves 13 project in opposite directions from the respective bars 12, and are yieldingly held in normal positions by means of U-shaped wire springs 14 terminally secured to the remote sides of the respective bars 12 and having their intermediate or yoke portions bearing upon the palmetto leaves or beater arms 13. The arms of the spring 14 are preferably provided with coils 15 adjacent the bars 12, to assist in the flexing action of the springs. The springs 14 normally hold the palm leaves 13 in proper position, and prevent the palm leaves from bending excessively or breaking, and furthermore return the palm leaves to normal position as soon as they are free.

The beams $5^a$ and $5^b$ of the two sections each carry a pan or receiver 16. Each of the pans or receivers 16 is formed from a sheet metal blank, and comprises the rectangular bottom 17 having the inclined triangular ends 18, the edges of the ends 18 having upturned complementing tongues or hanger arms 19, while the outer edge of the bottom 17 is provided with an upturned flange 20 terminally riveted or otherwise secured to the basal portions of the respective tongues or arms 19. The pans 16 are disposed longitudinally underneath the beams $5^a$ and $5^b$ with those edges of the bottom plates 17 of the pans, remote from the flanges 20 arranged adjacent each other to coöperate with the row of plants, and to work close to the sides of the stalks.

The tongues or arms 19 of the pans 16 are provided with series of apertures 21 through which retaining rings or elements 22 are engageable. The arms 19 of the pan 16 lying below or carried by the beam $5^b$ receives the said beam, and the retaining rings 22 are engaged through the respective apertures 21 so as to surround the beam $5^b$ and hold the beam and arms 19 in place. The other pan 16 has the center rods 9 of the beam $5^a$ received between the arms 19 of the two pairs and the retaining rings 22 are engaged through the respective apertures 21 of the said arms 19 to embrace the rods 9 to hold the beam $5^a$ and its pan in place relative to one another. Thus, the pans 16 are arranged to oscillate laterally relative to the beams, and by adjusting the retaining rings 22, the relative vertical position of the beams and pans may be regulated as desired. The pans 16 may ride upon the soil in the form of runners, or the beams $5^a$ and $5^b$ may be carried by the usual handles or lifting levers (not shown) of the cultivator in the same manner that the ordinary cultivator beams or gang rods are manipulated. The forward inclined ends 18 of the pans or receivers 16 serve as fenders to enable the pans to pass over rocks and other obstructions, and the diagonal or oblique edges of the forward ends 18 of the pans will also serve to deflect any stray objects out of the path of the pans, or to swing the pans laterally away from any unyielding obstructions so that the pans may pass the same without injury.

The actuating means for the beater or agitator 11 carried by the main section 5, embodies a transverse shaft 23 journaled in suitable bearings 24 attached to the upright portions of the arched axle 1, a sprocket wheel 25 being secured upon one end of the shaft 23, and having a sprocket chain 26 trained therearound. The sprocket chain 26 is passed around a sprocket wheel 27 rigidly or fixedly secured to one of the ground wheels 2 whereby when the cultivator is drawn over the soil, the rotation of the said ground wheel will impart a rotatory movement to the shaft 23.

A bevel gear 28 is secured upon the shaft 23, and one end portion of a flexible shaft 29 is journaled through one of the bearings 24 and carries a bevel gear 30 intermeshing with the bevel gear 28. The other or lower end of the flexible shaft 29 is journaled through a suitable bearing 31 attached upon the forward cross rod 10 of the beam $5^a$, and carries a spur gear 32 intermeshing with a spur gear 33 formed upon the forward ends of the bars 12. The parts or sections of the spur gear 33 are formed upon the ends of the two bars 12, whereby when the bars 12 are detached, they may be readily applied to or removed from the corresponding rod 6 of the beam $5^a$.

In practice, after the usual cultivator beams or gang rods are detached from the coupling sockets 4, the beams $5^a$ and $5^b$ of the present appliance may be attached to the coupling sockets in order to readily apply the present appliance to the cultivator, it being understood that if it is desired, the cultivator blades or earth tilling elements may be attached to the rear or free ends of the beams $5^a$ and $5^b$ of the present appliance. Thus, it is even possible to cultivate or work the soil during the collecting or gathering operation. The shank formed by the forward coiled portion 8 of the beam $5^a$ provides the means for engaging the respective coupling socket 4. It is evident that by adjusting the retaining rings or elements 22, the pans or receivers 16 and beams $5^a$ and $5^b$ may be adjusted vertically relative to one another, as desired or necessary.

Then when the cultivator is drawn forward with the arched axle 1 astride the row of plants, the sections of the present appliance will trail at the opposite sides of the row of plants, and the operative connection between the beater or agitator 11 and one of the ground wheels 2, will cause the beater to be rotated. The palmetto leaves 13 in brushing against the sides of the plants will shake or agitate them for dislodging the boll weevil or insects, in order that they will be caught and collected by the pans or receivers 16. The insects may be discharged from the receivers from time to time, and may be destroyed or exterminated in any desirable manner. The present appliance in being applicable to various cultivators, eliminates the necessity of a special truck or sulky therefor, which is of advantage for obvious reasons. Although the present appliance is adapted particularly for collecting boll weevil, which are so destructive in the cotton growing regions, yet the appliance may be employed with success for gathering other insects also.

Having thus described the invention, what is claimed as new is:—

1. An insect collecting device embodying a beam, a pan disposed therebelow and embodying a bottom having inclined triangular ends, the edges of the said ends having upwardly projecting complementing arms receiving the beam, one edge of the bottom having an upturned flange terminally secured to the respective arms, and retaining means carried by the arms and engaging the said beam.

2. In an insect collecting mechanism, a beam, a receiver disposed therebelow and connected thereto, a rotary agitator embodying a pair of bars clamped together over a portion of the beam to rotate thereon, palmetto leaves having their stems secured to the said bars and projecting in opposite directions therefrom, and U-shaped springs secured to the said bars and having their intermediate portions bearing against the said leaves.

In testimony that I claim the foregoing as my own, I have hereto affixed my signature in the presence of two witnesses.

HUGH C. MAYERHOFF.

Witnesses:
B. T. SPEED,
C. C. HAND.

Copies of this patent may be obtained for five cents each, by addressing the "Commissioner of Patents, Washington, D. C."